United States Patent [19]
Torkilsen et al.

[11] Patent Number: 6,073,387
[45] Date of Patent: Jun. 13, 2000

[54] HOLDER FOR FISHING TIP-UPS

[76] Inventors: Joel Torkilsen, 4041 Green Bay Rd.; John Melnik, 1803 Damanik Dr., both of Racine, Wis. 53404

[21] Appl. No.: 09/342,161

[22] Filed: Jun. 17, 1999

Related U.S. Application Data

[62] Division of application No. 09/100,907, Jun. 19, 1998, Pat. No. 5,970,651.

[51] Int. Cl.$^7$ ..................................................... A01K 97/01
[52] U.S. Cl. ........................ 43/54.1; 206/315.11; 206/372
[58] Field of Search ............................. 43/1, 4, 4.5, 54.1, 43/21.2; 206/315.11, 372; 211/70.6, 70.8, 70.7, 85.21; 294/143, 146, 159, 161

[56] References Cited

U.S. PATENT DOCUMENTS

| | | | |
|---|---|---|---|
| 291,704 | 1/1884 | Felch | 206/372 |
| 816,959 | 4/1906 | Briganti | 211/70.6 |
| 2,035,639 | 3/1936 | Davis | 211/70.6 |
| 2,291,381 | 7/1942 | Drake | 211/70.6 |
| 2,334,839 | 11/1943 | Purchas | 206/372 |
| 2,501,811 | 3/1950 | Cochran | 206/372 |
| 2,505,510 | 4/1950 | Vermillion | 206/372 |
| 2,595,746 | 5/1952 | Zinn | 206/315.11 |
| 3,751,845 | 8/1973 | Van Leeuwen | 43/56 |
| 4,538,862 | 9/1985 | Chandler | 312/283 |
| 4,826,007 | 5/1989 | Skeie | 206/373 |
| 4,925,026 | 5/1990 | McKay | 206/373 |
| 4,986,427 | 1/1991 | Law et al. | 211/70.8 |
| 5,125,183 | 6/1992 | Tisdell | 43/54.1 |
| 5,152,494 | 10/1992 | Frunzar | 43/21.2 |
| 5,186,329 | 2/1993 | Fogelberg | 206/373 |
| 5,271,520 | 12/1993 | McAfee | 206/373 |
| 5,294,163 | 3/1994 | Lang | 294/161 |
| 5,303,500 | 4/1994 | Luukonen | 43/54.1 |
| 5,350,065 | 9/1994 | Darrey | 206/373 |
| 5,379,885 | 1/1995 | Chen | 206/373 |
| 5,678,700 | 10/1997 | Crosson, Jr. | 211/70.8 |
| 5,704,496 | 1/1998 | Latta | 211/70.6 |
| 5,794,799 | 8/1998 | Collins et al. | 211/70.6 |
| 5,836,446 | 11/1998 | Varnom | 211/70.6 |
| 5,924,568 | 7/1999 | Zajonc | 206/373 |
| 5,967,315 | 10/1999 | Langtry, II | 206/315.11 |

*Primary Examiner*—Michael J. Carone
*Assistant Examiner*—Darren W. Ark
*Attorney, Agent, or Firm*—Jansson, Shupe, Bridge & Munger, Ltd.

[57] ABSTRACT

A holder for fishing tip-ups, including upper and lower horizontal members defining at least one spaced aligned pair of upper and lower receiving-sites, respectively, the pair of receiving-sites configured to receive a tip-up for carrying purposes. The upper horizontal member is preferably an inwardly-extending annular ledge forming a holder-member top opening through which fishing gear may be inserted for carrying, the ledge defining the upper receiving-sites as complementary to a tip-up and most preferably opening radially inwardly, and the lower horizontal member defining the lower receiving-sites as complementary to a tip-up. In certain embodiments, for each lower receiving-site there are two upper receiving-sites to accommodate tip-ups of different widths, and the lower horizontal member defines the lower receiving-site as complementary at different depths to tip-ups of different widths. The holder member is preferably removably nestable within a fishing bucket member.

8 Claims, 6 Drawing Sheets

HOLDER FOR FISHING TIP-UPS

RELATED APPLICATION

This is a division of patent application Ser. No. 09/100,907, entitled MULTI-PURPOSE FISHING BUCKET APPARATUS, which was filed Jun. 19, 1998, and is now U.S. Pat. No. 5,970,651.

FIELD OF THE INVENTION

This invention relates to equipment for carrying fishing tackle and, more particularly, to combination tackle-carrying and seating apparatus for use in fishing.

BACKGROUND OF THE INVENTION

Fishing is one of the oldest recreational activities known to man, and many hundreds of devices have been developed to facilitate the carrying of fishing tackle to wherever fishing will take place. Given that fishing is also an activity intended to take time, a variety of portable devices have been devised to allow fishermen to sit off the ground wherever they might be while they are fishing.

Indeed, devices having multiple functions, such as for carrying tackle and sitting and/or other purposes, have been developed. Merely by way of example, U.S. Pat. No. 4,295,680 (Grasso) discloses a bucket device which serves various functions, including storage, a seat, a table, and a buoy marker, and U.S. Pat. No. 100,801 (Pratt) discloses a device having both flotation and sitting purposes.

Given that recreational fishing is always carried out at bodies of water—whether from boats, from the shore, or even on ice in the middle of lakes—water safety is always an important consideration. Particularly in boat fishing and in ice fishing, there is risk that fishermen, whether children or adults, may fall into the water and need help. There is a continuing need for improved and highly-accessible safety and rescue equipment for fishermen.

Regarding carrying functions, one device used for fishing, particularly for ice fishing, is what is called the "tip-up." Tip-ups are devices allowing a fisherman to watch multiple lines at one time. Such devices can be somewhat difficult to carry as part of the fishermen's tackle, and can tend to become entangled together or with other fishing equipment during carrying. There is a need for an improved device for carrying tip-ups.

While multi-purpose fishing bucket apparatus is known, as pointed out above, there is a need for an improved apparatus having safety functions, as well as improved carrying functions.

OBJECTS OF THE INVENTION

It is an object of this invention to provide improved multi-purpose fishing bucket apparatus overcoming the deficiencies and shortcomings of the prior art.

Another object of this invention is to provide an improved and highly-accessible safety device for rescue purposes as needed during fishing.

Still another object of this invention is to provide a safety device for fishing which serves the essential purpose of providing a means for carrying fishing tackle.

Another object of this invention is to provide an improved bucket for carrying fishing tackle, which serves further important purposes.

Still another object of this invention is to provide an improved holder for carrying tip-ups.

Yet another object of this invention is to provide an improved multi-purpose fishing bucket which can serve as a seat, a bucket for carrying fishing tackle, a device for carrying tip-ups in organized fashion—either alone or with other fishing tackle, and a safety-rescue device.

These an other important objects of the invention will become apparent from the descriptions of this invention which follow.

BRIEF SUMMARY OF THE INVENTION

This invention is an improvement in multi-purpose fishing bucket apparatus, particularly of the type having a bucket member with an upper lip and a cover-seat member engageable with the lip. Specifically, the invention is an improvement wherein the cover-seat member includes a floatable ring, a separate middle portion detachable from the ring and a line extending between the ring and the middle portion. Still more specifically, the floatable ring has an inner edge and an outer edge, the outer edge being engageable with the upper lip of the bucket, and the separate middle portion being detachably engaged to the ring at the inner edge.

The line secured between the ring and the middle portion is such that the ring, after removal from the bucket member and detachment of the middle portion from the ring, may be thrown by a rescuer while tethered to the middle portion held by the rescuer. Thus, a bucket-chair being used for fishing can essentially instantly be converted to a rescue apparatus for immediate use in an emergency.

In preferred embodiments, the middle portion of the cover-seat member includes an underside with line-spooling structure. Most preferably, such line-spooling structure includes a downwardly-extending main portion and a lower-retention edge extending outwardly therefrom. This allows coiling of the line around the main portion of the spool, and allows the coiled line to stay in place until the device is needed.

In highly preferred embodiments, the middle portion of the cover-seat member is friction fit to the inner edge. Likewise, it is preferred that the outer edge of the ring be friction fit to the lip of the bucket member. This allows easy closing and opening of the fishing bucket apparatus, and easy detachment and reattachment of the middle portion of the cover-seat member from the ring for all appropriate purposes.

The frictional engagement of the middle portion is limited by virtue of an outwardly-projecting flange on the middle portion which engages the ring from above, preferably in an annular indentation in the ring sized to receive the flange. This feature prevents jamming of the middle portion within the ring, as might otherwise occur by virtue of a heavy person's sitting on the device over a period of time. This flange feature assures that the middle portion can be detached readily from the ring for rescue purposes.

It is preferred that the middle portion and ring opening be sized large enough such that the ring can be received onto the arm of a fisherman. This facilitates holding during rescue operations.

It is preferred that the middle portion of the topside of the cover-seat member have a recess in it and a handle extending across the recess. Such substantially protuberance-free seating surface allows a comfortable, generally flat seating surface.

In preferred embodiments, the ring has a line-sized groove about it at one radial location. Such groove receives the line thereabout in a manner such that it does not interfere with the tightness of the friction fits—either of the outer edge of the ring to the lip of the bucket member, or of the middle portion to the inner edge of the ring.

Certain highly preferred embodiments also include a holder member within the bucket member, the holder member being adapted to carrying tip-ups as used, e.g., in ice fishing. The holder member includes upper and lower horizontal members defining at least one spaced aligned pair of upper and lower receiving-sites, respectively. Such pair of receiving sites are configured to receive a tip-up for carrying purposes. More specifically, each pair of upper and lower receiving-sites holds a tip-up at two positions along its length—on at one end of the tip-up and the other at a second position along the length of the tip-up.

In such embodiments, it is highly preferred that the device include a plurality of spaced pairs of receiving-sites such that a plurality of tip-ups can be held and carried.

In highly preferred embodiments, the upper horizontal member is an inwardly-extending annular ledge forming a holder-member top opening through which fishing gear may be inserted for carrying. Thus, whether used alone or nested in the bucket member, the holder member or bucket-with-holder-member may be used to carry a variety of fishing tackle in addition to tip-ups. Or the holder member can be removed if tip-ups are not being carried on a fishing trip.

The ledge which is the preferred upper horizontal member defines one or more upper receiving-sites in the form of apertures which are complementary to a tip-up. Such upper receiving-sites preferably open radially inwardly to the top opening formed by the annular ledge. This facilitates engagement and disengagement of tip-ups with the holder member because it provides clearance for certain structure on the tip-ups.

In preferred embodiments, the lower horizontal member of the holder member defines one or more lower receiving-sites in the form of well-like troughs which are complementary to the end of a tip-up. In highly preferred embodiments, for each lower receiving-site there are two upper receiving-sites complementary for tip-ups of different widths. In certain of such embodiments, each lower receiving-site is complementary at different depths to tip-ups of different widths. Most preferably, lower horizontal member, in addition to providing lower receiving-sites, spans across the holder member to provide a closed bottom for it.

The holder member is preferably removably nested within the bucket member, but in some cases may be integrally formed with the bucket member. In the preferred removably nested form, it is highly preferred that the bucket member and the holder member nested therein be substantially cylindrical. Furthermore, it is preferable (though optional) that the bucket member be of sufficient vertical dimension such that tip-ups can be enclosed therein even with the cover-seat member in place.

As already noted, the holder member can be used either in nested engagement with the bucket member, or it can be used alone for the purpose of carrying tip-ups. Either way, the use of such holder member allows carrying of tip-ups in organized fashion—such that they do not become entangled with each other and tend not to become entangled with other fishing tackle during transportation or storage.

DETAILED DESCRIPTION OF PREFERRED EMBODIMENTS

Figure 1:
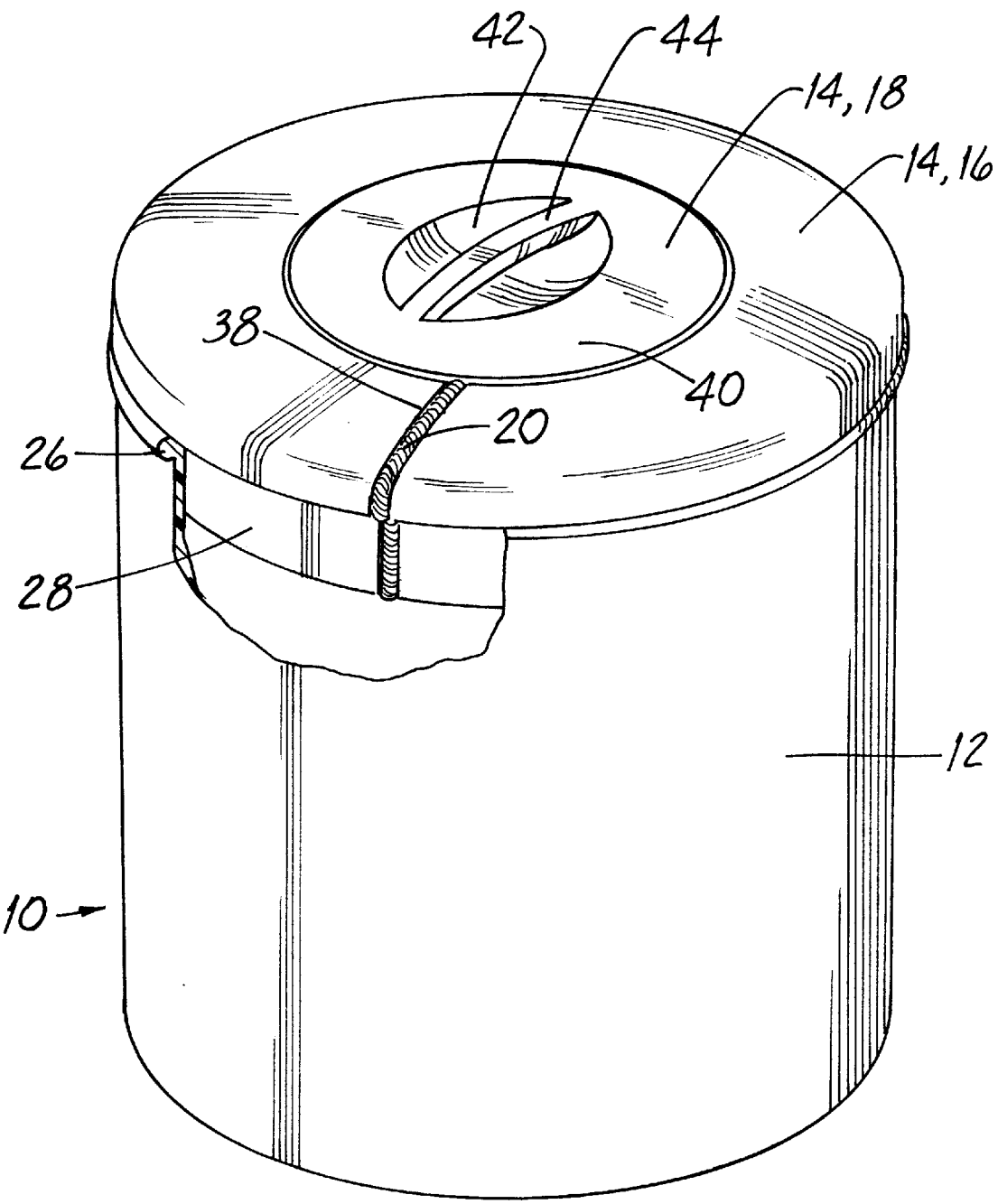
FIG. 1 is a perspective view of a preferred multi-purpose fishing bucket in accordance with this invention.
Figure 2:
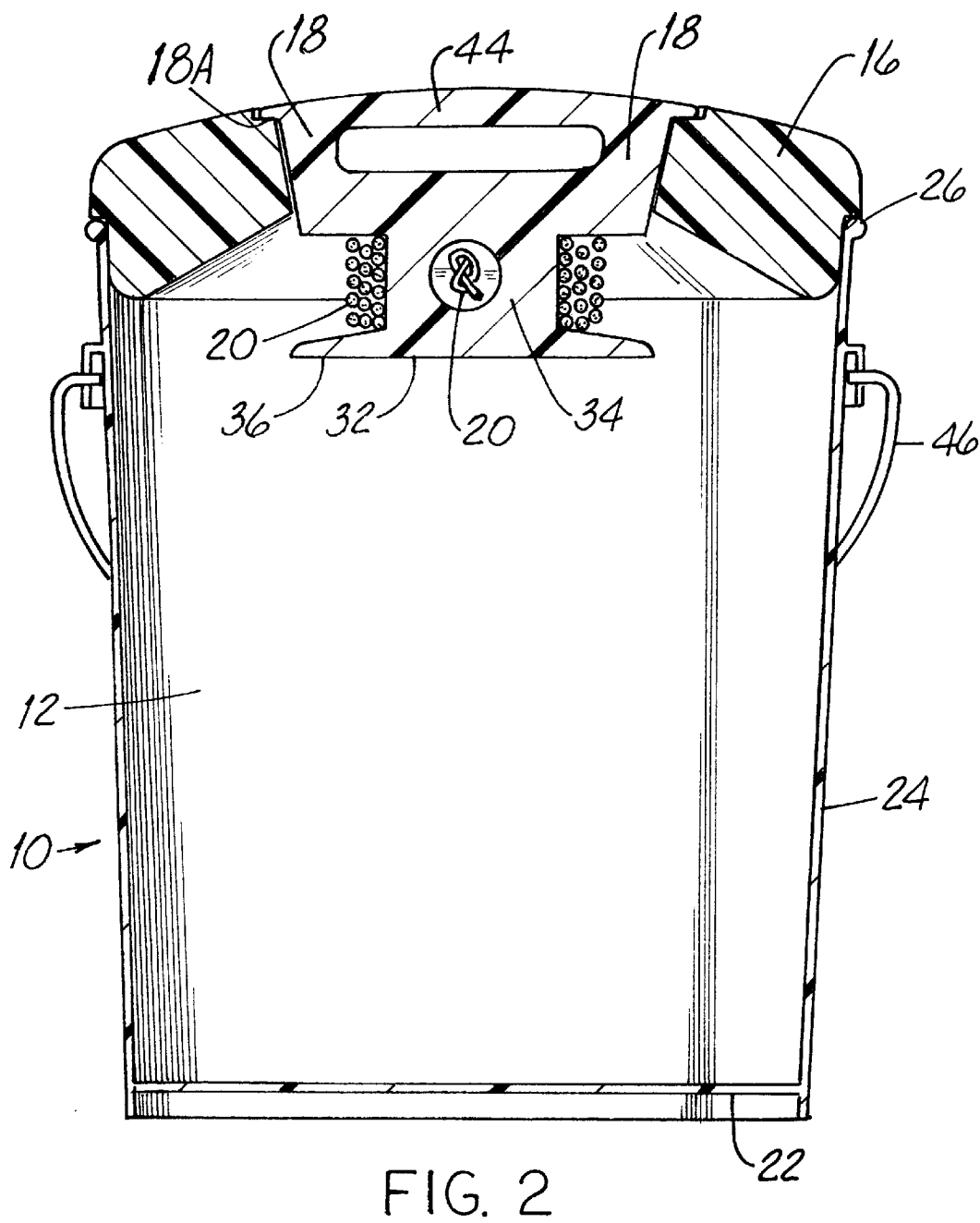
FIG. 2 is a side sectional view of the device of FIG. 1.
Figure 3:
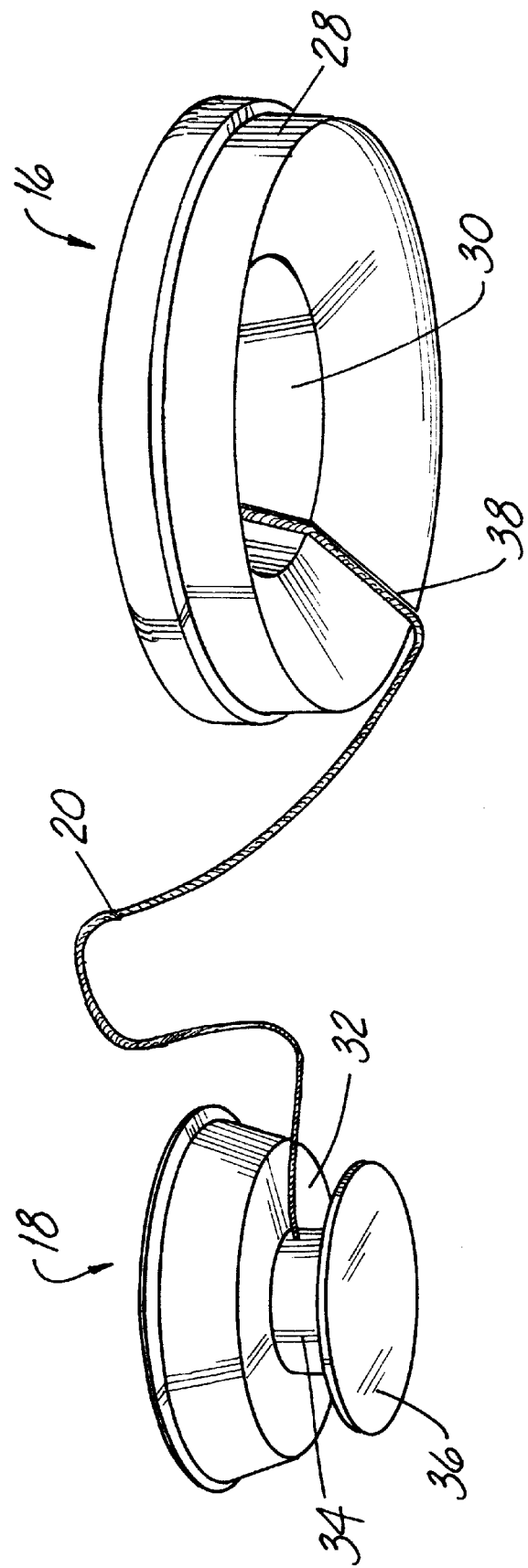
FIG. 3 is a fragmentary perspective view of detached ring and middle portion, ready for use for purposes of rescue.

The figures illustrate a multi-purpose fishing bucket apparatus 10 in accordance with this invention. FIGS. 1–3 shows one embodiment of the invention, and FIGS. 4–7 show another embodiment including further features.

As shown in FIGS. 1–3, fishing bucket apparatus 10 includes a bucket member 12, a cover-seat member 14 formed of a floatable outer ring 16 and a separate middle portion 18, and a line 20 secured at its opposite ends to ring 16 and middle portion 18. The device also includes a bucket bail 46 (see FIG. 2) for carrying purposes.

Bucket member 12 includes a bottom 22 and a sidewall 24 which terminates upwardly in bucket lip 26. Cover-seat member 14 is engageable by friction fit with bucket lip 26. More specifically, floatable ring 16 has an outer edge 28 which is friction fit with lip 26. Ring 16 also includes an inner edge 30 by which separate middle portion 18 is detachably engaged to ring 16—also by friction fit. Such friction fits are tight enough to provide a firm interconnection of parts, but loose enough such that cover-seat member 14 can readily be removed from bucket member 12, and middle portion 18 can be readily be removed from outer ring 16. Middle portion 18 has an outwardly-projecting flange 18A which engages ring 16 from above in an annular indentation in such ring. This prevents jamming of middle portion 18 into ring 16.

Middle portion 18 is sized large enough such that the hole in ring 16 which ring 16 can be received onto the arm of a fisherman. This facilitates holding during rescue operations.

Middle portion 18 includes an underside 32 which has a line-spooling structure thereon. The line-spooling structure includes a downwardly-extending main portion 34 and a radially-extending lower-retention edge 36. As shown in FIG. 2, line 20 is coiled about line-spooling structure main portion 34 for convenient storage. One end of line 20 is secured to main portion 34 as shown in FIGS. 2 and 3, while the other end of line 20 is secured to ring 16 in a ring groove 38 which extends about ring 16 at one radial location thereon. This is illustrated best in FIGS. 1 and 3, and also in FIG. 4. By means of groove 38, line 20 does not protrude beyond the main surface of ring 16, and thus does not interfere with the aforementioned friction fit.

As shown best in FIGS. 1 and 2, middle portion 18 has a topside 40 which has a recess 42 therein and a handle 44 which extends across recess 42. This structure provides a smooth topside 40 to facilitate sitting by the user; that is, topside 40 is substantially free of any protuberances which could make sitting less comfortable.

Floatable ring 16 may be made of a solid lightweight plastic material, a foam-filled plastic casing, a hollow plastic structure or any other material which is highly buoyant so that it can serve rescue purposes. A wide variety of acceptable materials will be apparent to those skilled in the art. Middle portion 18 may be made of similar materials or may be made of somewhat heavier materials, since middle portion 18 need not be buoyant. Bucket member 12 is preferably made of a sturdy plastic material, again as well-known to those skilled in the art. The material and structure are sufficient to support the weight of a fisherman. Line 20 is preferably a nylon rope of suitable size and strength.

Figure 4:
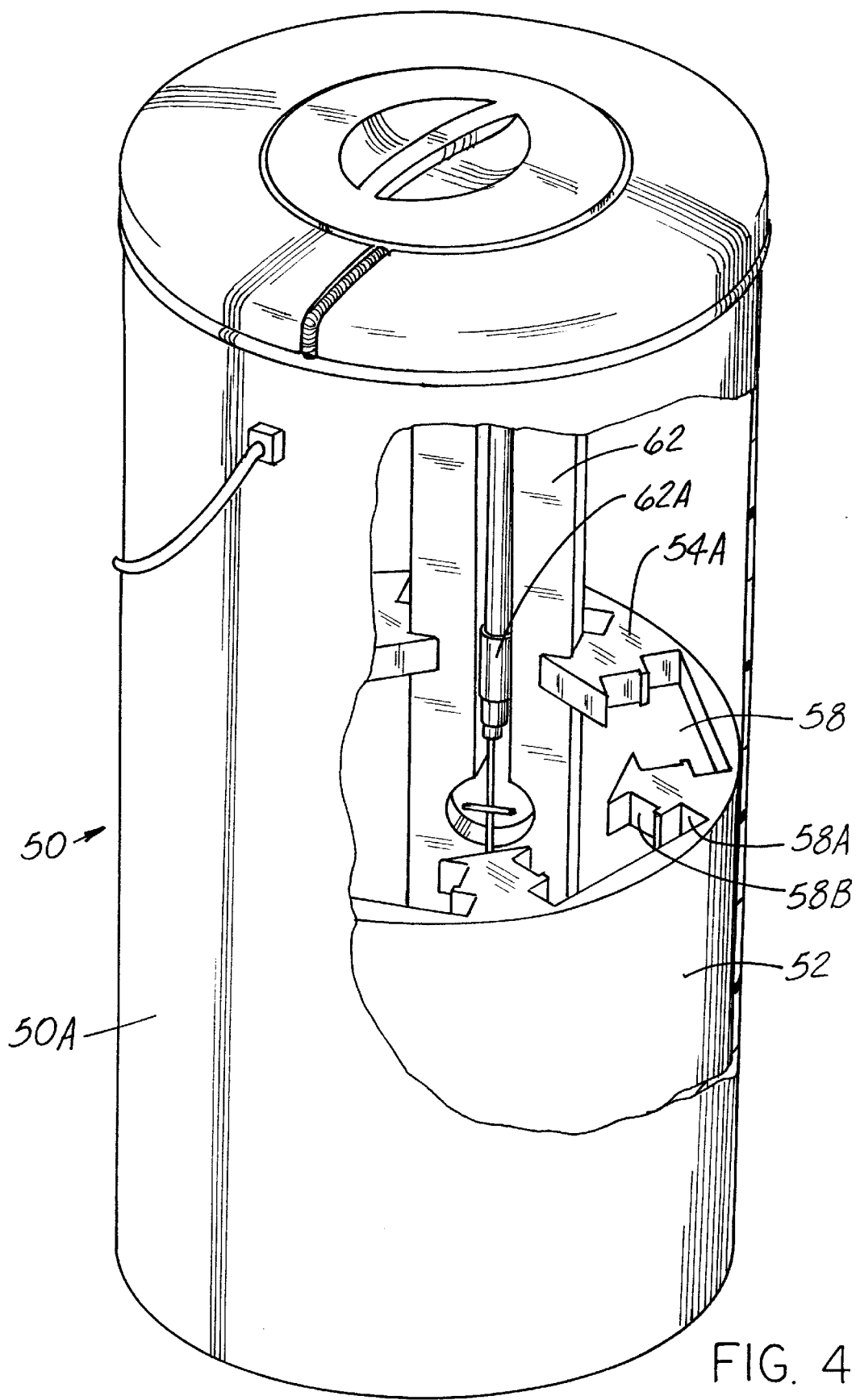
FIG. 4 is a broken-away perspective view of an alternative embodiment with a contained tip-up holder member.
Figure 5:
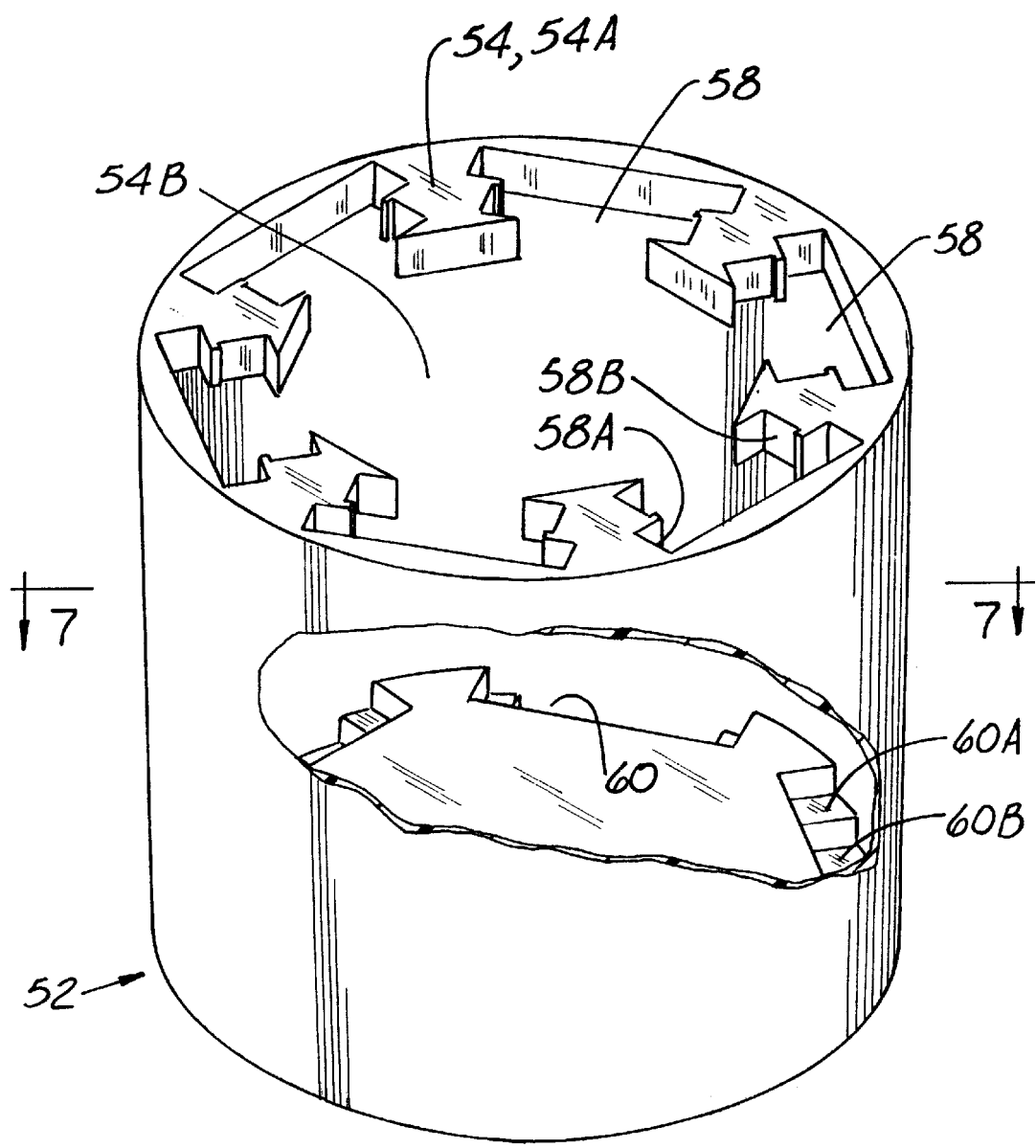
FIG. 5 is a broken-away perspective view of the tip-up holder member of FIG. 4.
Figure 6:
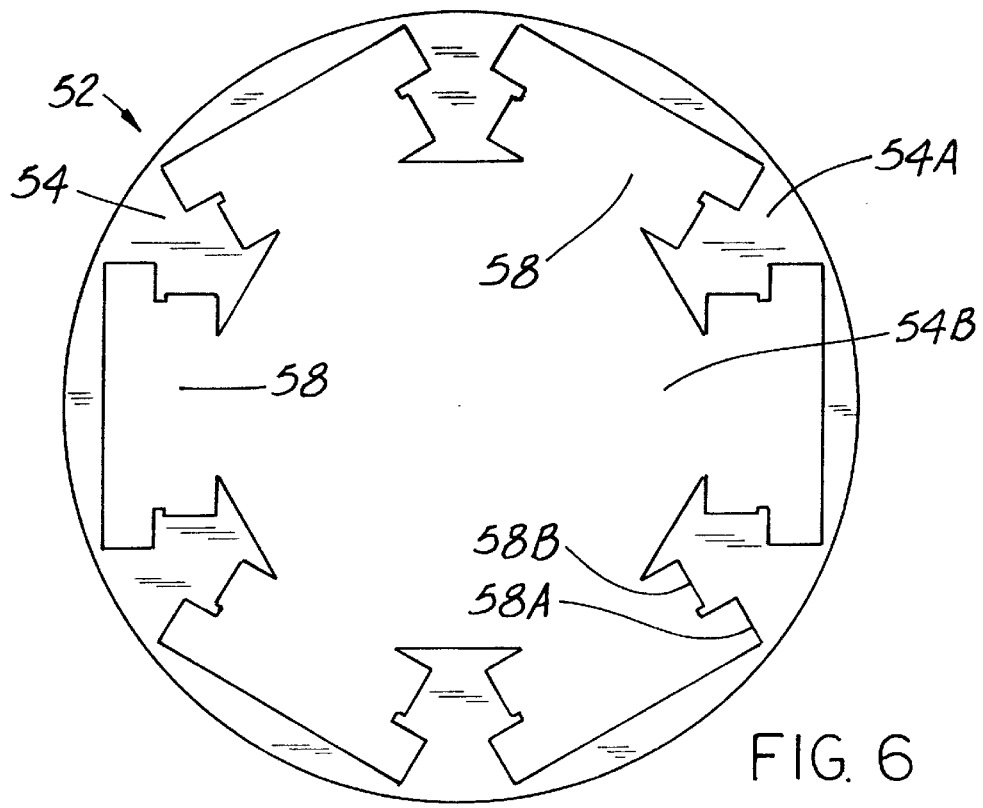
FIG. 6 is a top plan view of the holder member of FIG. 5.
Figure 7:
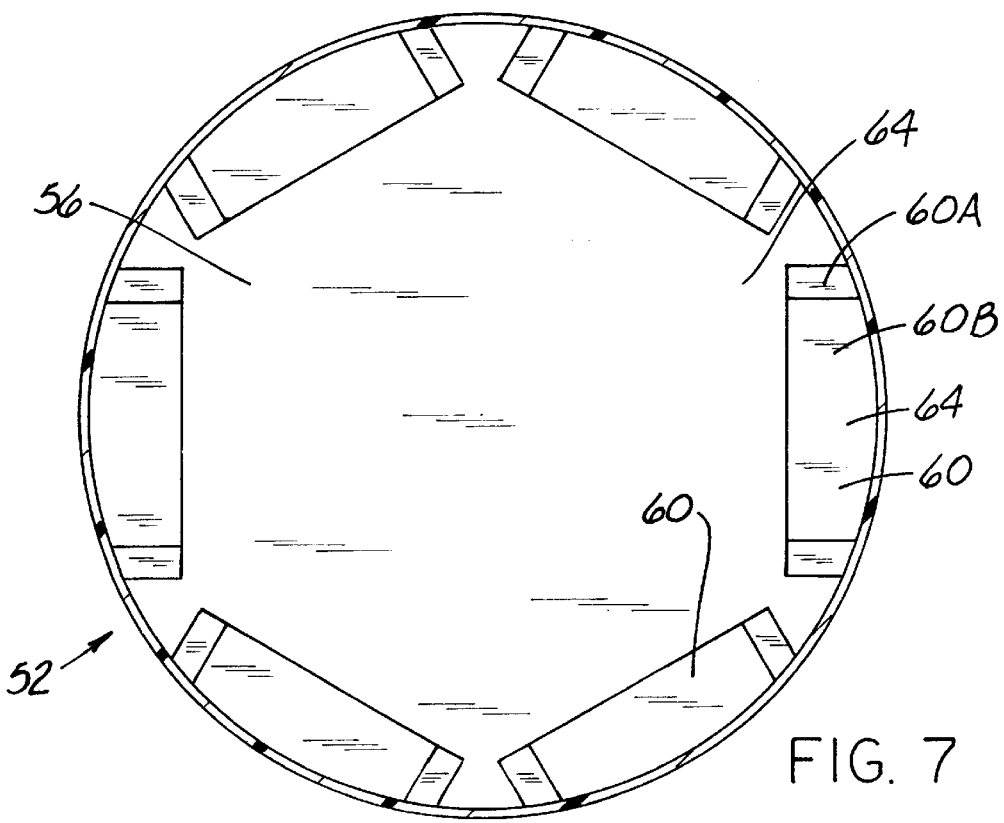
FIG. 7 is mid-level sectional view of the holder member, taken along section 7—7 as indicated in FIG. 5.

FIGS. 4 illustrates another multi-purpose fishing bucket apparatus 50 in accordance with another embodiment of this invention, and FIGS. 5–7 illustrate an internal portion thereof. Multi-purpose fishing bucket apparatus 50 is somewhat taller than fishing bucket apparatus 10; this provides a higher seat and also allows carrying of additional fishing tackle and supplies. Fishing bucket apparatus 50 is taller by virtue of having a bucket member 50A of greater vertical dimension.

Fishing bucket apparatus 50 also differs from fishing bucket apparatus 10 in that it includes a tip-up holder member 52 nested within bucket member 50A. Holder member 52 and bucket member 50A are substantially cylindrical and of close external and internal dimensions, respectively, such that they are removably nested together. While holder member 52 is preferably removably located within bucket member 50A, holder member 52 can also be permanently attached (or integrally formed) with bucket member 50A. (FIG. 4 illustrates the preferred removable nested relationship, but also may be taken as illustrating the alternative permanently-attached relationship.)

As shown best in FIGS. 4 and 5, holder member 52 includes an upper horizontal member 54 and a lower horizontal member 56. Such horizontal members, which have generally-planar surfaces, form six aligned pairs of upper and lower tip-up receiving-site locations 58 and 60, respectively, Tip-up receiving-site locations 58 and 60 are configured to be complementary with tip-ups, such that tip-ups may be supported therein in the manner tip-up 62 is supported as shown in FIG. 4. Each upper tip-up receiving-site location 58 is paired with a lower receiving-site location 60 for purposes of supporting one tip-up by insertion therein. Thus, up to six tip-ups can be supported by holder member 52.

Upper horizontal member 54 is an inwardly-extending annular ledge 54A. Annular ledge 54A, by virtue of its annularity, forms a top-opening 54B in holder member 52, as shown best in FIG. 6. Top-opening 54B facilitates insertion of additional fishing gear (other than tip-ups) into holder member 52.

Annular ledge 54A is designed with the cross-sections of the most common tip-ups in mind, in order to form upper tip-up receiving sites at upper receiving-site locations 58. There are two upper receiving-sites 58A and 58B at each of the six receiving-site locations 58, as shown best in FIGS. 4–6. Upper receiving-sites 58A and 58B receive tip-ups of wider and narrower widths, respectively. Commonly-used tip-ups come in different widths, and receiving-sites 58A and 58B are configured to accommodate nearly all standard sizes. As illustrated in FIG. 4, tip-up 62 is of a narrower width and is located in upper receiving-site 58B.

Upper receiving-sites 58B in annular ledge 54A open radially inwardly (laterally) to top opening 54B. Such lateral opening facilitates the insertion of a typical tip-up, with its middle structure 62A shown in FIG. 4.

As shown best in FIGS. 5 and 7, lower horizontal member 56 of holder member 52 defines lower receiving-site locations 60. Lower receiving-site locations 60 are also complementary to typical tip-ups to facilitate insertion of tip-up ends therein. Each such location is complementary at different depths to tip-ups of different widths. More specifically, a first depth is illustrated by numeral 60A (or first lower tip-up receiving site 60A), which accommodates the end of a wider tip-up, such as is accommodated by upper tip-up receiving-site 58A. A second depth is illustrated by numeral 60B (or second lower tip-up receiving site 60B), which accommodates the end of a narrower tip-up, such as is accommodated by upper tip-up receiving-site 58B.

Lower horizontal member 56 includes a closed bottom 64. Thus, upon removal of nested holder member 52, the carried tip-up or tip-ups can be removed along with any other related fishing tackle contained loosely in holder member 52.

The height of multi-purpose fishing bucket apparatus 50 is sufficient such that tip-up 62 may be contained therein with the cover-seat member in place. Holder member 52 can also be used separately from bucket member 50A as an open device for carrying tip-ups and other fishing tackle. In such situations, it is preferable that holder member 52 itself have a bail or some sort of carrying handle.

Holder member 50A is preferably formed of rigid plastic material. Materials suitable for holder member 50A are similar to those used for bucket member 12, and will be well known to those skilled in the art.

While the principles of the invention have been shown and described in connection with specific embodiments, it is to be understood clearly that such embodiments are by way of example and in no way limit the scope of this invention.

What is claimed is:

1. A holder member for holding fishing tip-ups, comprising:

a container having a first closed end, a second opposite end, and a vertical wall extending therebetween, the closed end including first and second lower tip-up receiving sites therein; and an upper horizontal member projecting from the vertical wall, the upper horizontal member including first and second spaced, cantilevered outer projections and a cantilevered intermediate projection therebetween, the first outer projection and the intermediate projection defining a first upper tip-up receiving site in axial alignment with the first lower tip-up receiving site and the intermediate projection and the second outer projection defining a second upper tip-up receiving site in axial alignment with the second lower tip-up receiving site;

wherein the first outer projection and the intermediate projection can retain a first corresponding tip-up received in the first upper tip-up receiving site, and wherein the intermediate projection and the second outer projection can retain a second corresponding tip-up in the second upper tip-up receiving site.

2. The holder member of claim 1 wherein each of the first and second lower tip-up receiving sites are defined by first and second vertically spaced, horizontal surfaces such that each of the first and second lower tip-up receiving sites has a first portion of a first vertical depth and a second portion of a second vertical depth greater than the first vertical depth.

3. The holder member of claim 2 wherein the first and second outer projections and the intermediate projection terminate at corresponding radially inner ends wherein the inner end of the first outer projection is spaced from the inner end of the intermediate projection and wherein the inner end of the second outer projection is spaced from the inner end of the intermediate projection.

4. The holder member of claim 1 wherein the first and second outer projections and the intermediate projection project radially inward towards the interior of the container.

5. A holder member for holding fishing tip-ups, comprising:
 a container having a first closed end, a second opposite end, and a vertical wall extending therebetween, the closed end including a lower tip-up receiving site therein which is defined by first and second vertically spaced, horizontal surfaces such that the lower tip-up receiving site has a first portion of a first vertical depth and a second portion of a second vertical depth greater than the first vertical depth; and
 an upper horizontal member projecting from the vertical wall and including first and second spaced projections, the first projection and the second projection defining first and second, upper tip-up receiving sites therebetween, the upper tip-up receiving sites radially offset from each other and overlapping the lower tip-up receiving site in the closed end of the container.

6. The holder member of claim 5 wherein the first and second project radially inward towards the interior of the container.

7. The holder member of claim 6 wherein the first and second projections terminate at corresponding radially inner ends wherein the inner end of the first projection is spaced from the inner end of the second projection so as to define an opening therebetween.

8. The holder member of claim 5 wherein each of the first and second upper tip-up receiving sites have differing widths.

* * * * *